US012652455B2

(12) United States Patent (10) Patent No.: US 12,652,455 B2
Pujari et al. (45) Date of Patent: *Jun. 9, 2026

(54) APPROACHES TO OBFUSCATING BIOMETRIC DATA FOR PRIVACY REASONS IN A BROWSER ENVIRONMENT AND SURVEILLANCE SYSTEMS FOR ACCOMPLISHING THE SAME

(71) Applicant: Verkada Inc., San Mateo, CA (US)

(72) Inventors: Pushpak Pujari, San Mateo, CA (US); Rishabh Goyal, San Mateo, CA (US); Song Cao, Foster City, CA (US); Erich J. Kreutzer, Cabin John, MD (US); Alan M. Anderson, Mountain View, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,939

(22) Filed: Jul. 11, 2024

(65) Prior Publication Data

US 2024/0364995 A1 Oct. 31, 2024

Related U.S. Application Data

(63) Continuation of application No. 18/191,808, filed on Mar. 28, 2023, now Pat. No. 12,069,363.
(Continued)

(51) Int. Cl.
*H04N 23/611* (2023.01)
*G06T 5/70* (2024.01)
(Continued)

(52) U.S. Cl.
CPC ............. *H04N 23/611* (2023.01); *G06T 5/70* (2024.01); *G06V 10/25* (2022.01); *G06V 20/52* (2022.01); *H04N 23/661* (2023.01)

(58) Field of Classification Search
CPC ...... G06V 10/22; G06V 10/225; G06V 10/25; G06V 40/161; G06V 40/16; G06V 40/168; G06V 40/169; G06V 40/103; G06V 40/10
See application file for complete search history.

(56) References Cited

U.S. PATENT DOCUMENTS 10,192,061 B2 1/2019 Kumar
10,740,617 B2 8/2020 Varadarajan et al.
(Continued)

OTHER PUBLICATIONS

International Search Report and Written Opinion for WO Patent Application No. PCT/US23/71823 mailed Nov. 29, 2023; 10 pages.

*Primary Examiner* — Boubacar Abdou Tchoussou
(74) *Attorney, Agent, or Firm* — Perkins Coie LLP; Michael A. Glenn

(57) ABSTRACT

Introduced here are surveillance systems and associated approaches for obfuscating biometric identifiers generated by, or available to, those surveillance systems for privacy reasons. In the event that a surveillance system generates a biometric identifier (e.g., by imaging a face of a person entering the premises of an organization), caution must be taken to only share the biometric identifier with individuals as necessary for security reasons. The approaches introduced here allow the privacy of persons being surveilled to be protected. Specifically, a computer program may selectively apply blurring as an impermanent mask to obfuscate each face in a digital image. This approach limits "reidentification" of a given person to those scenarios where her identity must be determined.

24 Claims, 13 Drawing Sheets

Related U.S. Application Data

(60) Provisional application No. 63/370,744, filed on Aug. 8, 2022.

(51) Int. Cl.
|  |  |
|---|---|
| *G06V 10/25* | (2022.01) |
| *G06V 20/52* | (2022.01) |
| *H04N 23/661* | (2023.01) |

(56)                References Cited

U.S. PATENT DOCUMENTS

| | | | |
|---|---|---|---|
| 10,915,660 | B2 | 2/2021 | Matusek et al. |
| 11,048,919 | B1 | 6/2021 | Modolo et al. |
| 11,069,036 | B1 | 7/2021 | Simhadri et al. |
| 11,094,042 | B1 | 8/2021 | Palmer |
| 11,665,316 | B2 * | 5/2023 | Decrop ..................... G06T 5/70 |
| | | | 348/14.08 |
| 2007/0153091 | A1 | 7/2007 | Watlington et al. |
| 2007/0201694 | A1 | 8/2007 | Bolle et al. |
| 2010/0328460 | A1 | 12/2010 | Merkel et al. |
| 2011/0150327 | A1 | 6/2011 | Yoo et al. |
| 2019/0068895 | A1 | 2/2019 | Hutz et al. |
| 2019/0325198 | A1 | 10/2019 | Friedland |
| 2019/0370980 | A1 | 12/2019 | Hollander et al. |
| 2021/0127071 | A1 | 4/2021 | Rebien et al. |
| 2021/0209734 | A1 | 7/2021 | Simhadri et al. |
| 2021/0240851 | A1 | 8/2021 | Badalone et al. |
| 2022/0019829 | A1 | 1/2022 | Tal et al. |
| 2022/0129582 | A1 | 4/2022 | Lange |
| 2022/0239848 | A1 * | 7/2022 | Swierk ................... H04N 7/147 |
| 2023/0133854 | A1 | 5/2023 | Vaezi Joze et al. |

* cited by examiner

200

300

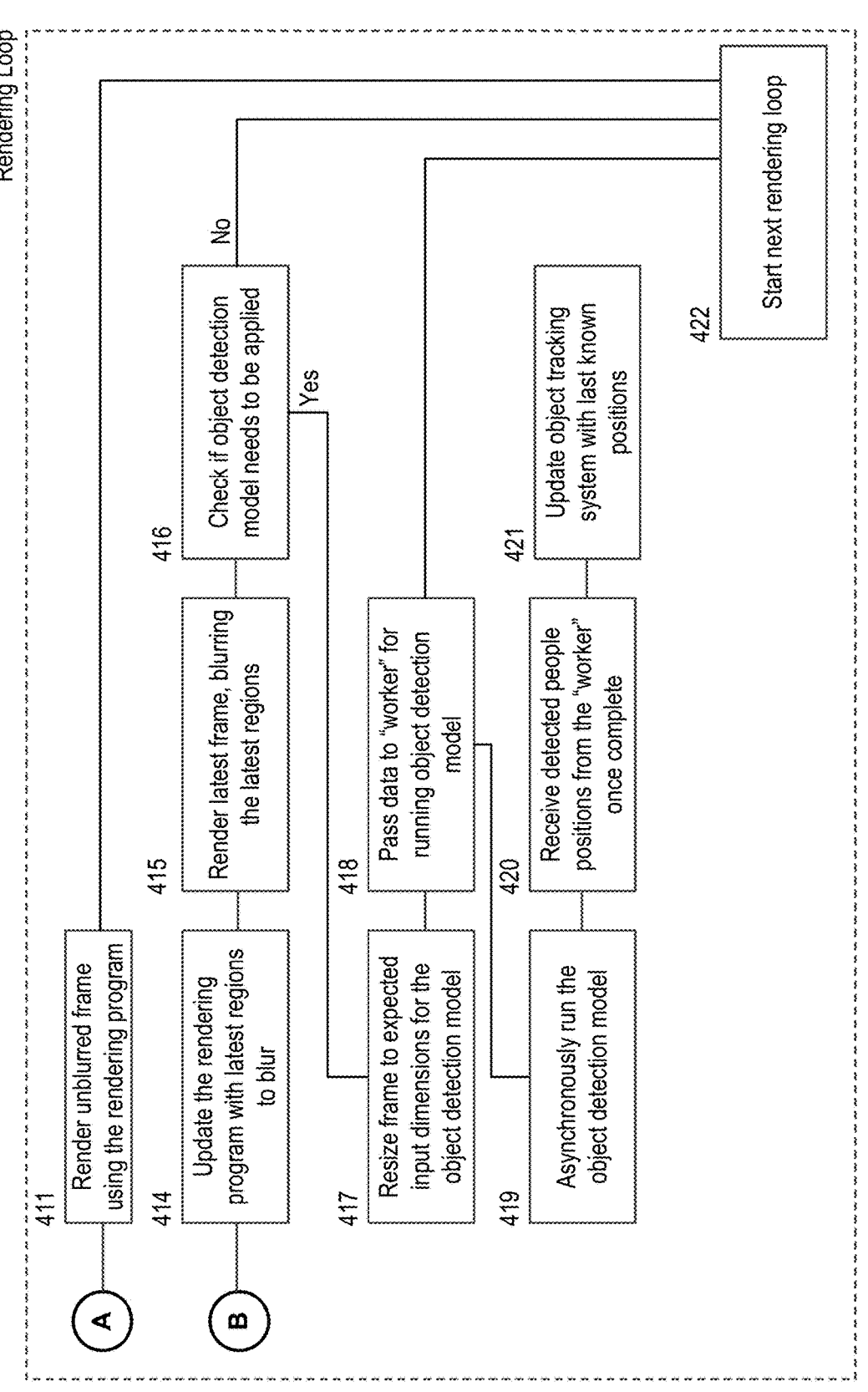
FIGURE 4, CONT.

FIGURE 5B
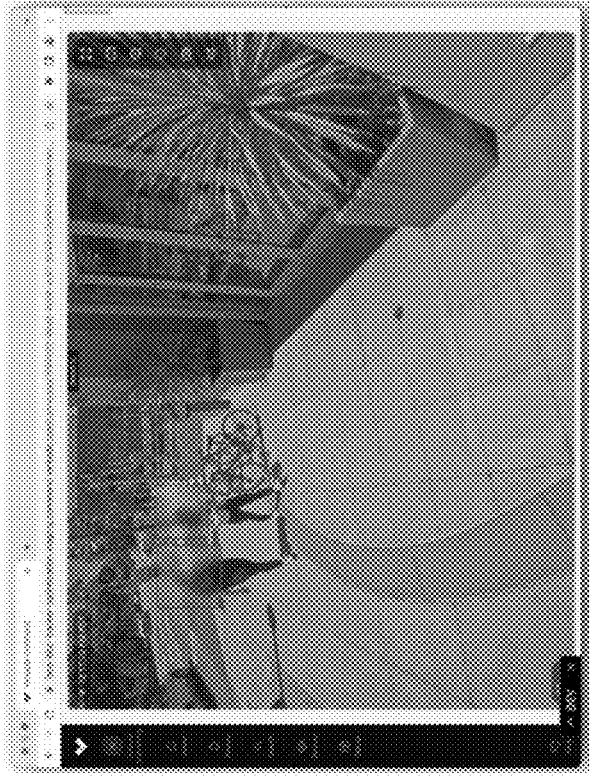
FIGURE 5A

<u>600</u>

601

Establish a connection with a digital camera that is part of a surveillance system responsible for monitoring an environment, such that digital images generated by the digital camera are received in temporal order over time

602

Initialize (i) a rendering program that allows for rendering in a canvas that is visible via a web browser, (ii) a thread that is programmatically independent from the canvas, (iii) an object detection model within the thread, and (iv) an object tracking system within the web browser

603

Determine whether a blur function is enabled

604

Establish a position of a person in each digital image and then determine, based on the position, a region to blur

605

Update the rendering program with the region to blur for the person, so as to cause each digital image to be presented on the canvas with an appropriate region blurred

Figure 7:
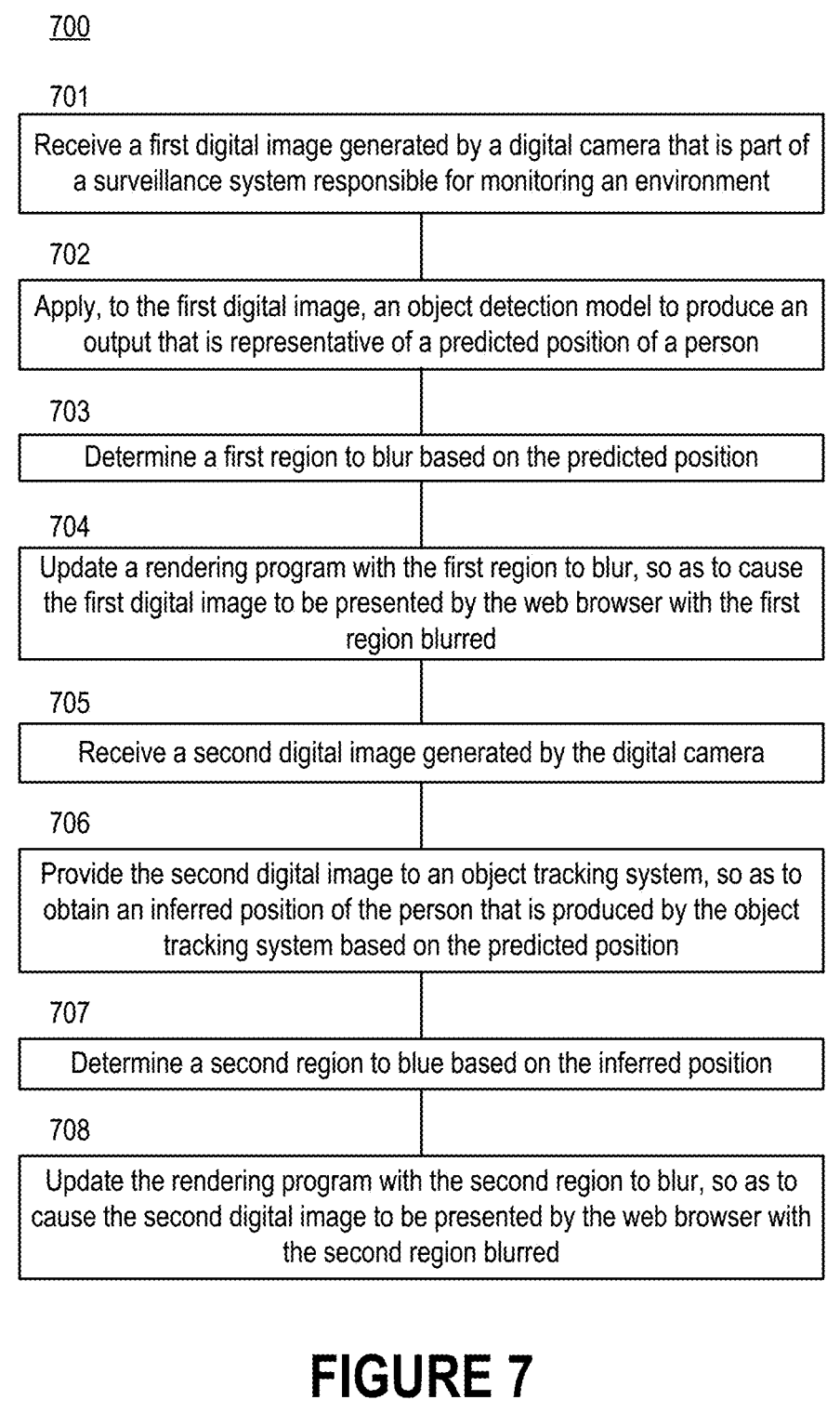

Receive a first digital image generated by a digital camera that is part of a surveillance system responsible for monitoring an environment

702

Apply, to the first digital image, an object detection model to produce an output that is representative of a predicted position of a person

703

Determine a first region to blur based on the predicted position

704

Update a rendering program with the first region to blur, so as to cause the first digital image to be presented by the web browser with the first region blurred

705

Receive a second digital image generated by the digital camera

706

Provide the second digital image to an object tracking system, so as to obtain an inferred position of the person that is produced by the object tracking system based on the predicted position

707

Determine a second region to blue based on the inferred position

708

Update the rendering program with the second region to blur, so as to cause the second digital image to be presented by the web browser with the second region blurred

APPROACHES TO OBFUSCATING BIOMETRIC DATA FOR PRIVACY REASONS IN A BROWSER ENVIRONMENT AND SURVEILLANCE SYSTEMS FOR ACCOMPLISHING THE SAME

CROSS-REFERENCE TO RELATED APPLICATIONS

This application is a continuation of U.S. application Ser. No. 18/191,808, titled "Approaches to Obfuscating Biometric Data for Privacy Reasons in a Browser Environment and Surveillance Systems for Accomplishing the Same" and filed on Mar. 28, 2023, which claims priority to U.S. Provisional Application No. 63/370,744, titled "Approaches to Obfuscating Biometric Data for Privacy Reasons in a Browser Environment" and filed on Aug. 8, 2022, each of which is incorporated by reference herein in its entirety.

TECHNICAL FIELD

Various embodiments concern surveillance systems and associated approaches for obfuscating biometric data generated by, or available to, those surveillance systems for privacy reasons.

BACKGROUND

The term "surveillance" refers to the monitoring of behavior, activities, and other changing information for the purpose of protecting people or items in a given environment. Generally, surveillance requires that the given environment be monitored using electronic devices such as digital cameras, lights, locks, door controllers, credential readers, sensors (e.g., that monitor temperature, volatile organic compounds, smoke, carbon monoxide, humidity, noise, motion, etc.) and the like. Collectively, these electronic devices may be referred to as the "edge devices" of a "surveillance system" or "security system." In operation, these edge devices generate data that can be examined in order to establish what has happened in the environment that is under surveillance. As an example, digital cameras may generate data that is representative of digital images of the environment.

Generally, an environment under surveillance is monitored by multiple edge devices. Assume, for example, that an organization is interested in having a physical building surveilled. Digital cameras may be installed near most, if not all, doors that are externally accessible. These digital cameras can generate digital images, for example, in response to detecting motion, and insights into accesses of the physical building can be gleaned through analysis of the digital images.

An important aspect of a surveillance system is the ability to review the data—or analyses of the data—that is generated by edge devices. Referring again to the aforementioned example, a security professional may be interested in reviewing the digital images in response to discovering that unauthorized access of the physical building has occurred. Various individuals may be able to access the data. For example, security professionals—who may be hired, but not employed, by the organization—may review the data, as well as employees of the organization, security administrators (e.g., employees of the manufacturer of the surveillance system, members of the organization's security group), and the like. Allowing these various individuals to access this data without restriction can be problematic, as the data may be sensitive.

BRIEF DESCRIPTION OF THE DRAWINGS

FIG. 5A includes an example of a screenshot that includes multiple people, and the face of each person has been identified and then blurred by the surveillance module.

FIG. 5B includes an example of a screenshot that includes a single person whose face is partially obscured (e.g., covered by a door frame).

FIG. 6 includes a flow diagram of a process for blurring a portion of a digital image that could be used to biometrically identify a person.

FIG. 7 includes a flow diagram of a process for selectively blurring regions in digital images for identity obfuscation purposes.

Figure 1:
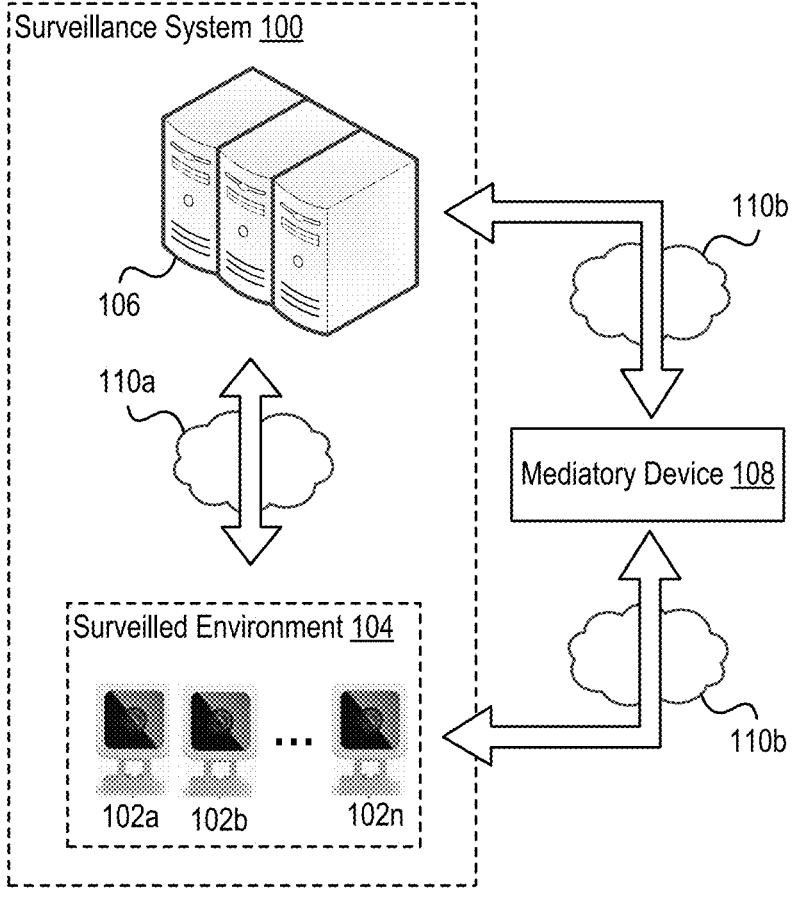
FIG. 1 includes a high-level illustration of a surveillance system that includes various edge devices that are deployed throughout an environment to be surveilled.

Various features of the technology described herein will become more apparent to those skilled in the art from a study of the Detailed Description in conjunction with the drawings. Various embodiments are depicted for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

As surveillance systems are deployed across different environments, from businesses to homes, an increasing amount of data is being generated. This data can—and often does—include biometric identifiers. For example, digital cameras that monitor the premises of an organization may generate digital images of individuals entering or exiting the premises, and these digital images may include the faces of these individuals. Note that the term "biometric identifier" may be used to refer to any distinctive, measurable characteristic that can be used to label, identify, or otherwise describe an individual. A digital image of a face is one example of a biometric identifier.

Biometric identifiers can be useful as a security mechanism. Referring again to the aforementioned example, being able to discern the faces of individuals entering or exiting the premises of the organization can be helpful in determining whether there has been a security breach. However, care must be taken to ensure that biometric identifiers are not widely accessible.

Introduced here are surveillance systems and associated approaches for obfuscating biometric identifiers generated by, or available to, those surveillance systems for privacy reasons. In the event that a surveillance system generates a biometric identifier (e.g., by imaging a face of a person entering the premises of an organization), caution must be taken to only share the biometric identifier with individuals as necessary for security reasons. As further discussed below, the approaches introduced here allow the privacy of persons being surveilled to be protected.

Assume, for example, that a surveillance system is responsible for monitoring the premises of an organization, and that the surveillance system includes a digital camera oriented towards an access point (e.g., a door of a building). The digital camera may generate digital images as people enter or exit through the access point. To ensure the privacy of those people, a computer program can obfuscate faces in those digital images. As further discussed below, the computer program may execute entirely within a web browser, or the computer program may be a standalone program (e.g., as part of a mobile application or desktop application).

Specifically, the computer program may selectively apply blurring as an impermanent mask to obfuscate each face. This approach limits "reidentification" of a given person to those scenarios where her identity must be determined. The mask can be implemented on the "frontend" and can be reversed, for example, by interacting with a digital element shown by an interface that is generated or supported by the computer program. Having faces be naturally blurred yet allowing faces to be controllably revealed is reflective of a balance between privacy and not hampering security investigations that rely on biometric identifiers.

Embodiments may be described in the context of executable instructions for the purpose of illustration. However, aspects of the present disclosure could be implemented via hardware or firmware in addition to, or instead of, software. For example, instructions for obscuring biometric identifiers may be executed by the processor of a computing device on which related data (e.g., digital images) are viewed through a web browser, mobile application, or desktop application. The computing device may be a mediatory device that is communicatively connected to a surveillance system. As another example, instructions for obscuring biometric identifiers may be executed by the processor of an edge device that is part of the surveillance system.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of Surveillance System

FIG. 1 includes a high-level illustration of a surveillance system 100 that includes various edge devices 102a-n that are deployed throughout an environment 104 to be surveilled. While the edge devices 102a-n in FIG. 1 are cameras, other types of edge devices could be deployed throughout the environment 104 in addition to, or instead of, cameras. Other examples of edge devices include lights, locks, door controllers, credential readers, sensors (e.g., that monitor temperature, volatile organic compounds, smoke, carbon monoxide, humidity, noise, motion, etc.) and the like. Meanwhile, the environment 104 may be, for example, a home or business.

In some embodiments, these edge devices 102a-n are able to communicate directly with a server system 106 that comprises one or more computer servers (or simply "servers") via a network 110a. In other embodiments, these edge devices 102a-n are able to communicate indirectly with the server system 106 via a mediatory device 108. The mediatory device 108 may be connected to the edge devices 102a-n and server system 106 via respective networks 110b-c. The networks a-c may be personal area networks ("PANs"), local area networks ("LANs"), wide area networks ("WANs"), metropolitan area networks ("MANs"), cellular networks, or the Internet. For example, the edge devices 102a-n may communicate with the mediatory device 108 via Bluetooth®, Near Field Communication ("NFC"), or another short-range communication protocol, and the edge devices 102a-n may communicate with the server system 106 via the Internet. As another example, the edge devices 102a-n may communicate with the mediatory device 108 via Bluetooth, and the mediatory device 108 may communicate with the server system 106 via the Internet or a cellular network.

Generally, a computer program executing on the mediatory device 108 is supported by the server system 106, and thus is able to facilitate communication with the edge devices 102a-n of the surveillance system 100. In some embodiments, the computer program is executable by a web browser, mobile application, or desktop application. In other embodiments, the computer program is representative of a standalone program (e.g., in the form of a mobile application or desktop application). Regardless of its form of implementation, the computer program may be referred to as a "surveillance module." Accordingly, a "surveillance module" may be executed by a web browser in order to obfuscate biometric identifiers included in data that are viewable through the web browser, or a "surveillance module" may be a mobile application or desktop application that is designed to facilitate the display and review of data that include biometric identifiers. Therefore, while embodiments may be described in the context of instructions that are executable by a web browser, the features may be similarly applicable to embodiments where the "surveillance module" is representative of a standalone program that is executable by the mediatory device 108 or implemented as part of a mobile application or desktop application that is executable by the mediatory device 108.

Meanwhile, the mediatory device 108 could be, for example, a mobile phone, tablet computer, or wearable electronic device (e.g., a fitness tracker or watch). In some embodiments, the mediatory device 108 is used as a means to access the environment 104. For example, the mediatory device 108 may be presented to one of the edge devices 102*a-n* in order to gain access to the environment 104. Thus, the mediatory device 108 may periodically enter the environment 104.

Figure 2:
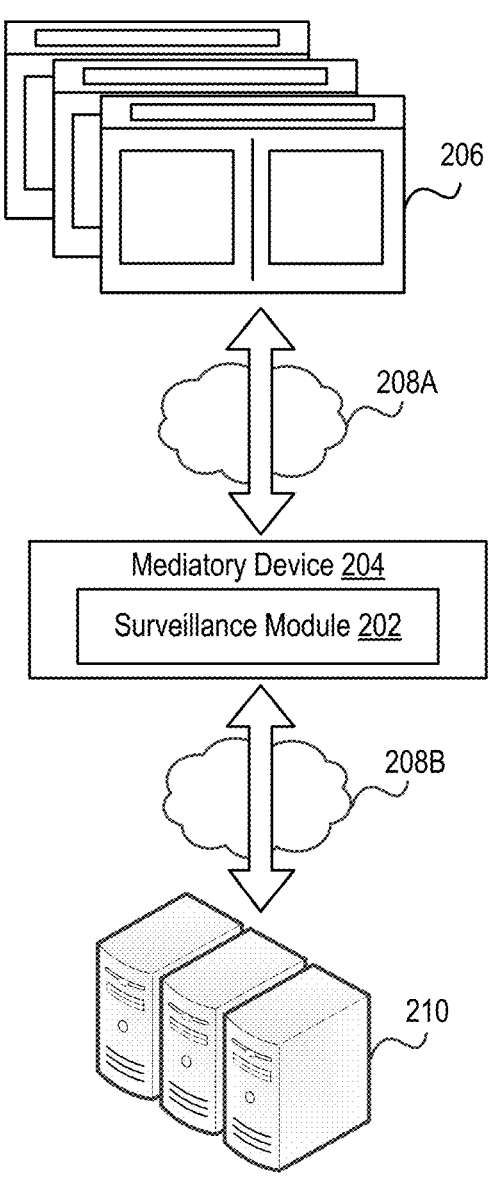
FIG. 2 illustrates a network environment that includes a surveillance platform that is executed by a mediatory device.

FIG. 2 illustrates a network environment 200 that includes a surveillance module 202 that is executed by a mediatory device 204. An individual (also called a "user") may be able to interact with the surveillance module 202 via interfaces 206. For example, the surveillance module 202 may be able to communicate with a surveillance system—and more specifically, its edge devices—so as to allow access to the environment under surveillance. As another example, a user may be able to access an interface through which she can review information related to (e.g., generated by) a surveillance system. Some interfaces are configured to facilitate interactions between users and surveillance systems, while other interfaces are configured to serve as informative dashboards for users.

As shown in FIG. 2, the surveillance module 202 may reside in a network environment 200. Thus, the mediatory device 204 on which the surveillance module 202 resides may be connected to one or more networks 208A-B. Depending on its nature, the mediatory device 204 could be connected to a PAN, LAN, WAN, MAN, or cellular network. Additionally or alternatively, the mediatory device 204 could be connected to Bluetooth communication channel, NFC communication channel, or another communication channel associated with another short-range communication protocol. For example, if the mediatory device 204 is a mobile phone, then the mediatory device 204 may be accessible to edge devices of a surveillance system via Bluetooth and a server system 210 via a cellular network.

In some embodiments, the surveillance module 202 is executed or implemented by another computer program executing on the mediatory device 204. Assume, for example, that the mediatory device 204 includes a web browser through which data generated by a surveillance system—or analyses of that data—can be reviewed. In such a scenario, the surveillance module 202 may reside on the mediatory device 204 in the form of a browser extension. The term "browser extension," as used herein, may be used to refer to software that, when executed, customizes the abilities or functionalities of a web browser.

In other embodiments, the surveillance module 202 is executed or supported by a cloud computing service operated by, for example, Amazon Web Services®, Google Cloud Platform™, or Microsoft Azure®. Thus, the mediatory device 204 may be communicatively connected to a server system 210 that comprises multiple computer servers. These computer servers can include rules for permitting access to an environment, algorithms (e.g., for processing data generated by edge devices), user information (e.g., credentials, role, access permissions, etc.), and other assets. Those skilled in the art will recognize that this information could also be distributed amongst the server system 210 and one or more computing devices, including the mediatory device 204.

To conserve processing resources, it is generally preferable to implement the approaches introduced herein on a computing device—like the mediatory device 204 or server system 210—that is not part of the deployed portion of the surveillance system. Said another way, it is generally preferred that the approaches not be implemented by the edge devices that generate the data to be altered. However, edge devices could include a surveillance module. In such embodiments, an edge device may alter data (e.g., by blurring faces) prior to transmission of the data external to the edge device. Additional information may need to be included in the transmission to ensure that the alteration is reversible, however. For example, in addition to the altered data (e.g., a digital image with a blurred face), the edge device may also transmit the original data (e.g., the digital image without any blurring) to the same destination. However, these data, namely, the altered data and original data, may be processed (e.g., filtered or downsized) by the edge device for easier transmission to the destination.

As mentioned above, aspects of the surveillance module 202 could be hosted locally, for example, in the form of a computer program executing on the mediatory device 204 that is accessible to a user. Several different versions of computer programs may be available depending on intended use. For example, some embodiments of the surveillance module 202 are designed to facilitate the sharing of pertinent security information associated with surveillance systems, while other embodiments of the surveillance module 202 are designed to simply communicate with edge devices of surveillance systems and then process data generated by those edge devices.

In-Browser Approach to Obfuscating Biometric Identifiers

For the purpose of illustration, an exemplary approach to obfuscating biometric identifiers is set forth below. Specifically, the following paragraphs concern an approach that can be taken to blur faces detected in digital images generated by a surveillance system using only browser-based technologies. A similar approach may be employed to obfuscate other types of biometric identifiers, such as audio samples that include voices, digital images that include identification badges, etc. Therefore, the approach could be extended to more broadly obfuscate data from which the identities of individuals is derivable.

Figure 3:
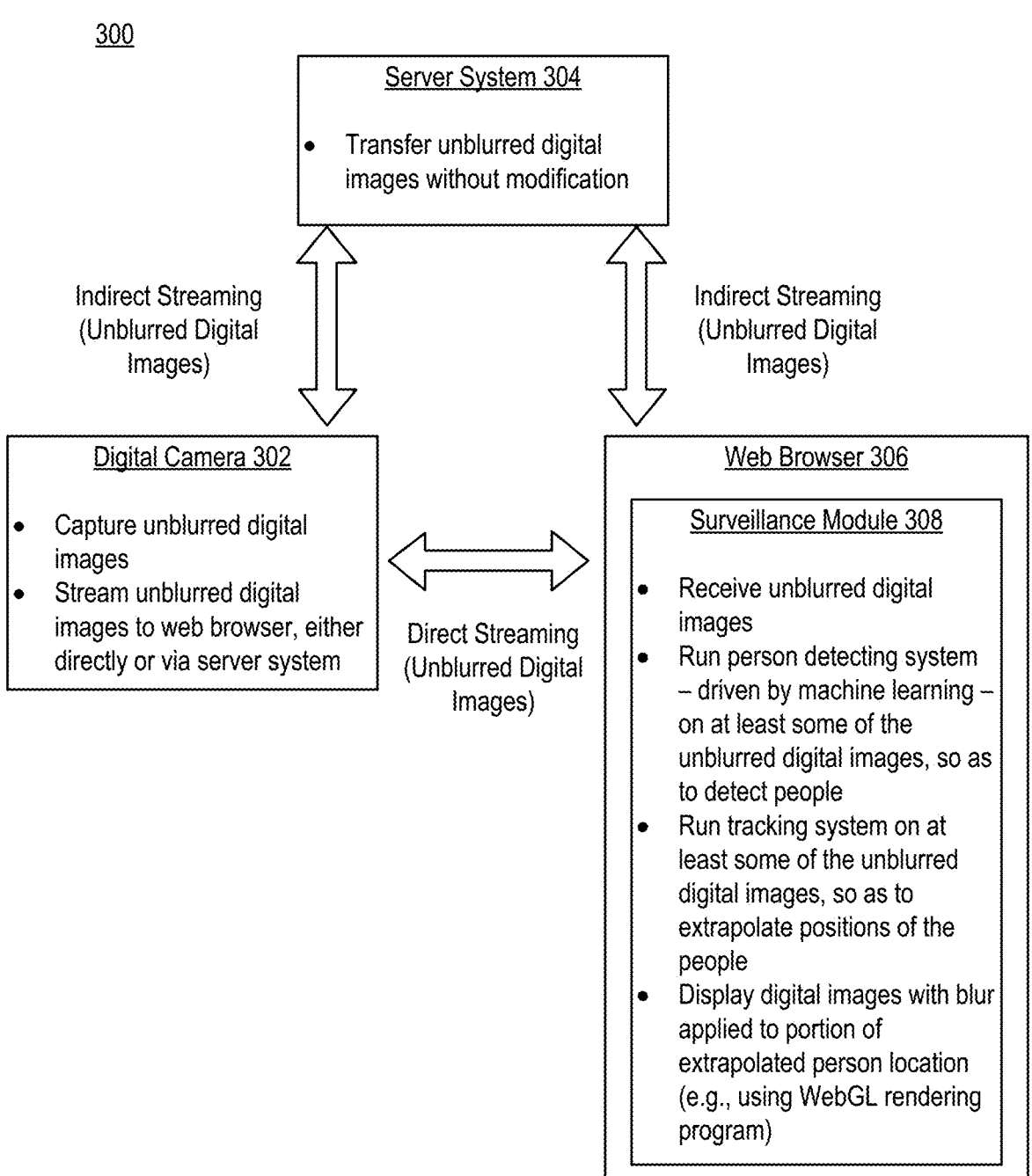
FIG. 3 includes a high-level illustration of an environment that includes an edge device—here, a digital camera—that transfers data to a server system or a web browser on which a surveillance module executes.

FIG. 3 includes a high-level illustration of an environment 300 that includes an edge device—here, a digital camera 302—that transfers data to a server system 304 or a web browser 306 on which a surveillance module 308 executes. For convenience, the server system 304 may simply be called the "cloud." As shown in FIG. 3, digital images can be directly streamed from the digital camera 302 to the surveillance module 308, or digital images can be indirectly streamed from the digital camera 302 to the surveillance module 308 via the server system 304. Generally, the digital images are streamed in real time in the form of a video feed, though the approach may be comparable if the digital images are instead still images captured on a periodic or ad hoc basis.

Conceptually, the standard browser-based video playback mechanism for playing video as a "video element" can be combined with an object detection machine learning model (or simply "object detection model") running as part of the surveillance module 308 to detect people. An object tracking system—also running as part of the surveillance module 308—can be used to track each person across the video feed, while a rendering system (e.g., a WebGL rendering system) can be used to create blurred digital images for display by the web browser 306. As further discussed below, each portion of each digital image corresponding to a face may be identified and then tracked, so as to allow each face to be blurred on a per-image basis. At a high level, the object tracking system may be representative of one or more machine learning models that together can detect and track the movement of objects in video in real time. Object detection systems generally include (i) an object detection component (e.g., a first machine learning model) that identifies the presence and location of one or more objects in the frames of the video and (ii) an object tracking component (e.g., a second machine learning model) that tracks the movement of each detected object over time across the frames of the video.

Fully processing high-quality video feeds (e.g., with at least 24 frames per second) in real time can be burdensome from a processing resource perspective. Simply put, the web browser 306 may struggle to support an object detection model and object tracking system that are capable of running at such speeds. Accordingly, the object detection model may be combined with the object tracking system by the surveillance module 308 to lessen the demands on the web browser 306 (and the computing device on which the web browser 306 is executing). Rather than process each digital image included in the video feed, the surveillance module 308 may apply the object detection model on a subset of the digital images (e.g., every other digital image, every third digital image, every fifth digital image) and then extrapolate the position of detected objects for those digital images to which the object detection model is not applied. As an example, the surveillance module 308 may apply the object detection model to every fifth digital image, and for the intervening digital images, the surveillance module 308 can extrapolate the position of a detected object based on its position in the digital image to which the object detection model was applied. This approach has the benefit of allowing low-latency playback because the digital images can be rendered as soon as they are available without needing to add in the latency of applying the object detection model before rendering.

Figure 4:
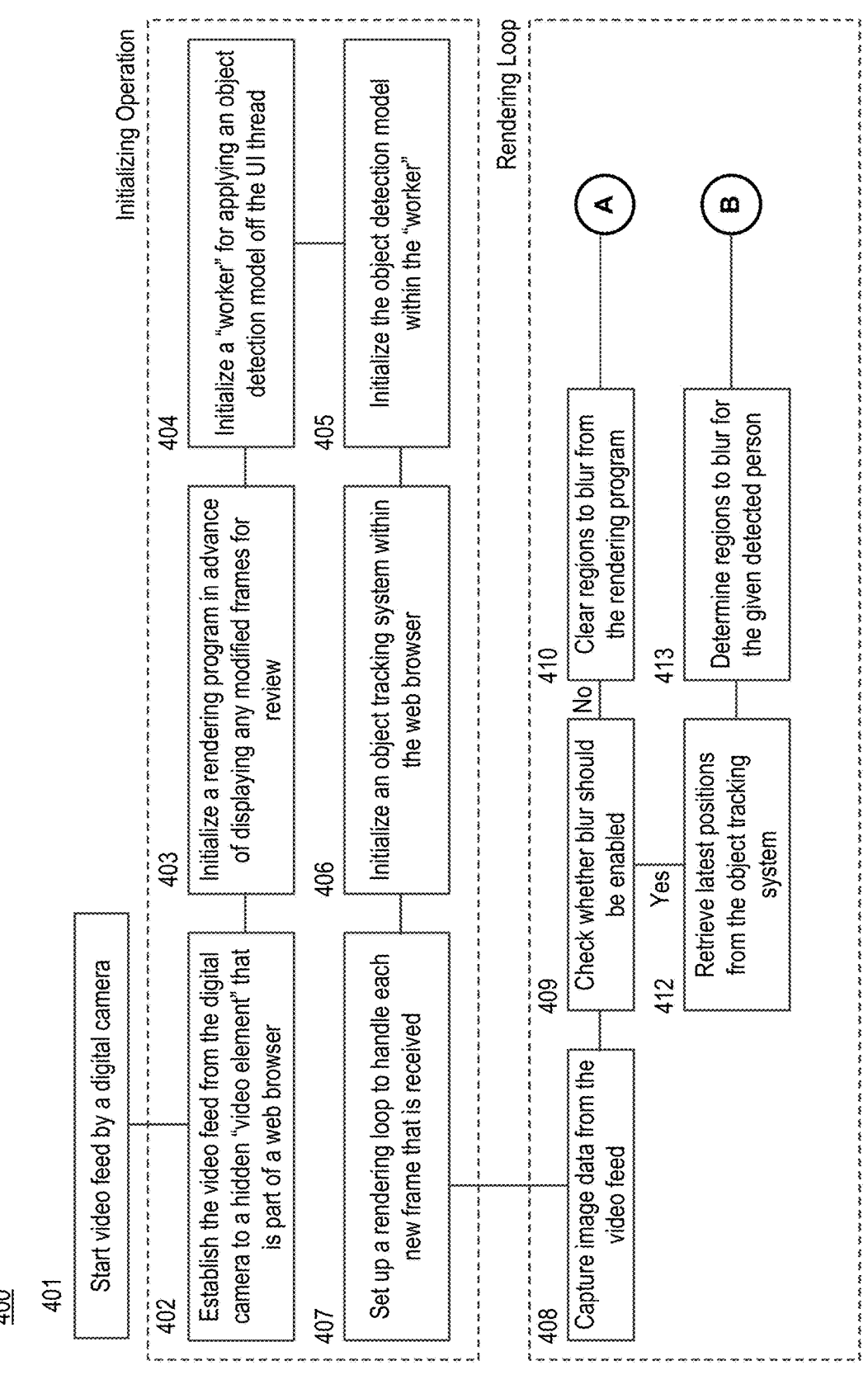
FIG. 4 includes a flow diagram of a process for initialing a video feed and then selectively obscuring portions of "frames" for security purposes.

FIG. 4 includes a flow diagram of a process 400 for initialing a video feed and then selectively obscuring portions of "frames" for security purposes. Initially, a video feed is started by a digital camera that is part of a surveillance system (step 401). The video feed may be started in response to input from a user (e.g., provided at the digital camera or provided through a mediatory device).

As part of an initializing operation, the video feed can be established from the digital camera to a hidden "video element" that is part of a web browser (step 402). As mentioned above, the video feed can be relayed from the digital camera to the web browser either directly or indirectly. Any suitable streaming technology could be used. Examples of suitable streaming technologies include Hyper-text Transfer Protocol ("HTTP") Live Streaming ("HLS"), Websocket Media Source Extensions, Web Real-Time Communication ("WebRTC"), and the like.

Within the web browser, a surveillance module can then initialize a rendering program in advance of displaying modified frames for review (step 403). A rendering program, such as WebGL, can enable content to use an application programming interface ("API") to perform two-dimensional ("2D") and three-dimensional ("3D") rendering in a Hyper-Text Markup Language ("HTML") canvas within the web browser. Thereafter, the surveillance module can initialize a "web worker" or simply "worker" for applying an object detection model off the user interface ("UI") thread (step 404). The terms "web worker" and "worker" are commonly used to refer to scripts (e.g., written in JavaScript) executed from HTML pages that run in the background, independent of any other scripts that may also have been executed from the same HTML page. Because workers run independent of other scripts, the performance of the HTML page is not affected by execution.

The surveillance module can then initialize the object detection model within the worker (step 405) and initialize an object tracking system (step 406) within the web browser more generally. Said another way, the required components for implementing the process 400 can be initialized by provisioning the worker with appropriate code. This includes not only the object detection model and object tracking system, but also the rendering program (and associated output canvas that is visible on an interface). In some embodiments, the object detection model is further initialized by "warming" with mock data so that future detections are quicker to run. Moreover, the surveillance module can set up a rendering loop to handle each new frame that is received (step 407).

After the hidden "video element" is determined to be ready for playback—for example, by determining that the "ReadyState" has reached an appropriate value—the surveillance module can enter the rendering loop as shown in FIG. 4. The rendering loop can utilize "requestVideoFrameCallback" if available in the web browser to be notified when the web browser has a frame that is ready for playback. Moreover, the surveillance module may fall back to "SetTimeout" or "RequestAnimationFrame" to schedule recurring callbacks at the frame rate of the video feed.

When a new frame is ready to be processed, the surveillance module can capture the corresponding image data from the video feed (step 408) and check whether blur should be enabled (step 409). To determine whether blur should be enabled, the surveillance module may examine one or more characteristics of the user to whom the frame is to be presented. For example, the surveillance module may determine the permission level of the user, the job title of the user, etc.

In the event that the surveillance module determines that the frame should not be blurred, the surveillance module can clear any regions to be blurred from the rendering program (step 410) and pass the frame to the rendering program (step 411) without doing any processing or while doing minimal processing. Then, the surveillance module can stop processing, so as to start the next rendering loop (step 422).

In the event that the surveillance module determines that the frame should be blurred, the surveillance module can retrieve the latest positions from the object tracking system (step 412). Specifically, the surveillance module may query, prompt, or otherwise ask the object tracking system to extrapolate out the position of any known detected people for the current frame. Assuming a person is detected by the object tracking system, the surveillance module can determine what regions, if any, to blur for the person (step 413). This can be done in several ways. As an example, the surveillance module may initially begin with a geometric region (e.g., a square, rectangle, or circle) that is situated near the top of the detected person. To ensure the region of interest—namely, the face—is fully captured, the surveillance module may shift or expand the geometric region. For example, the geometric region may be shifted up to 20 percent of its size and expanded by up to 15 percent of its size. This expansion is intended to provide some leeway in accuracy of the object detecting and tracking.

Thereafter, the surveillance module can pass the frame and locations of the geometric region to the rendering problem, so as to update the rendering program with the latest regions to blur (step 414). For example, the surveillance module may provide, to the rendering program, the frame along with coordinates that define the periphery of the geometric region determined to include the face. The frame may be passed to the rendering program as one texture, while another texture may be generated that describes all of the regions where blurring should occur. The rendering program can then render the latest frame, blurring the latest regions specified by the surveillance module (step 415). In some embodiments, a multipass blurring program (e.g., an OpenGL Shading Language blurring program) is run to performantly blur the frame onto the output canvas, so that the user can see the frame with blurred faces. Then, the surveillance module can check whether the object detection model needs to be applied (step 416). As mentioned above, the object detection module may be applied on a consistent basis to periodically establish a "ground truth" for objects included in the frames.

As mentioned above, if there is ongoing object detection for the video feed, or if the last video feed started more recently than a predetermined amount of time (e.g., 25, 50, or 250 milliseconds), then nothing further may be done for the frame. Instead, the surveillance module may start the next rendering loop (step 422). The predetermined amount of time that has expired since the last object detection run may be tunable given the tradeoff between processing resources available to, and used by, the computing device executing the web browser and the number of frames used by the object tracking system. Generally speaking, the extrapolation process becomes less accurate as more time passes from the last object detection run. Otherwise, the surveillance module can run object detection for the frame as shown in FIG. 4.

To accomplish this, the surveillance module can draw the frame onto a canvas that matches the dimensions of the expected input of the object detection module (step 417). This can be done in such a manner so as to maximize image size for a given aspect ratio within the canvas without stretching either dimension. The surveillance module can then pass the data to the worker responsible for applying or running the object detection module (step 418). This can be done in numerous ways depending on predicted or actual performance within the browser. Preferably, the surveillance module may use a technology that allows transferring of the data from the main thread of the worker without employing a copy operation in a way that also avoids the need to read the data from the canvas in the main thread (e.g., by using "CreateImageBitmap" to receive an "ImageBitmap" that is a transferrable type). Alternatively, the surveillance module may read the data from the main thread into a type array that can be transferred to the worker thread without requiring a copy operation.

The worker can then asynchronously run the object detection model (step 419). In the worker, the object detection model may be run in the fastest or most computationally efficient way possible. For example, the worker may use a WebGL execution provider if available, but fall back to WebAssembly in the event that the WebGL execution provider is not available. After the worker has completed object detection asynchronously, the surveillance module can pass the detected people positions back to the main thread (step 420). As mentioned above, each detected people position may be defined using coordinates that define the periphery of a geometric region. For convenience, the geometric region may be referred to as a "bounding box" that defines the area in which a person is detected. In the main thread, the surveillance module can pass the detected people positions to the object tracking system (step 421), so that the object tracking system can update its internal tracking list to improve extrapolation results the next time that extrapolation is necessary.

In sum, the aforementioned approach supports three core functionalities.

First, the ability to detect biometric identifiers in real time from a web browser. While the process of FIG. 4 is described in the context of detecting faces (and more specifically, busts) in digital images generated by a digital camera, the process may be applicable to other types of biometric identifiers. For example, similar steps may be taken to obfuscate audible features in audio generated by a microphone (e.g., that is part of a digital camera or another edge device).

Second, the ability to apply blurring as an impermanent mask to obfuscate the biometric identifier to prevent reidentification. The mask can be implemented on the "frontend" and can be reversed by a simple interaction with the interface as further discussed below. This serves as a tradeoff for ensuring privacy while not hampering investigations that require knowledge of biometric identifiers.

Third, the ability to reduce computational requirements and improve operational efficiencies of running the object detection model in the web browser across different computing devices (e.g., mobile phones, tablet computers, laptop computers, desktop computers) by using object tracking to predict movement of people and then applying the mask where the people are expected to be. This not only allows the object detection model to run at a lower frequency but also reduces computational requirements while maintaining performance (e.g., as measured by precision and recall).

Buffered Playback to Reduce Frequency of Object Detection Runs

In situations where the object detection model is even less performant (e.g., in older web browsers or "lightweight" web browsers designed for mobile devices), the surveillance module may need to run object detection even less frequently. Because extrapolation by the object tracking system becomes less accurate the more time elapses between object detection runs, the surveillance module can switch to a buffered playback system that allows the object tracking system to use the more accurate interpolation instead of extrapolation.

The general flow of such a process is similar to FIG. 4, but instead of rendering each frame on demand, the surveillance module can capture frames to a canvas and queue those frames to be rendered at a later time. While the frames are in the queue, the surveillance module can continue to perform object detection as frames are received from the "video element." The queue can be designed, constructed, or set to be large enough that the surveillance system can run object detection on more than one frame before rendering the first frame for review by the user. For example, passing the two most recent frames to the object detecting system may allow the system to interpolate the positions of the tracks between those frames. When the surveillance module goes to render the captured frames from the queue, the surveillance module can ask the object detecting system for the interpolated positions of people that need to be blurred.

Optimizations to Support Blurring Video Feeds Concurrently

There may be situations where a surveillance platform (also called a "security platform") needs to play back video from multiple digital cameras at the same time. For example, the surveillance platform may display a video feed generated by a first digital camera oriented toward an external side of an access point contemporaneously with a video feed generated by a second digital camera oriented toward an internal side of the access point. In these situations, further optimization may need to be performed since usage of computational resources may overwhelm the web browser or underlying computing device when the aforementioned process is performed on multiple video feeds concurrently.

Examples of optimizations include:

Lowering the resolution of the object detection model to speed up the inference process at the cost of accuracy. In this situation, the surveillance module can increase the size of the blurred area to accommodate lower accuracy by the object detection model.

Running multiple workers, each of which can run a separate instance of the object detection model, to more fully utilize the computational resources of the underlying computing device (e.g., multiple central processing unit ("CPU") cores).

Batching together frames for at least some runs of the object detection model.

Compositing frames from each video feed onto a single canvas and then running object detection for multiple video feeds in a single run. The surveillance module can then map the detected people back to the appropriate frames and use those as results. This approach can cut the number of runs of the object detection model to be consistent regardless of the number of video feeds being shown at any given time.

Performing Object Detection on Edge Device

As an extension of the aforementioned approach, it may be possible to run the object detection model on the edge device—namely, the digital camera—from which a video feed is obtained. The edge device could apply the object detection model to all frames of the video feed, or the edge device could apply the object detection model to a subject of the frames in the video feed. After the data is conveyed to the web browser (e.g., via a WebRTC data channel), the data can be fed to the object tracking system as an alternative to the in-browser detection that is normally performed in the worker.

Illustrative Examples of Outputs

FIGS. 5A-H include examples of screenshots that illustrate how one or more portions of a frame can be blurred to ensure the privacy of people captured in digital images generated by a surveillance system. Note that boxes are shown to indicate the bounds of the geometric region being blurred. However, these boxes may not be present in the version posted to an interface for review. Instead, the blurred portion of a frame may simply appear to naturally blend with the unblurred portion of the frame.

FIG. 5A includes an example of a screenshot that includes multiple people, and the face of each person has been identified and then blurred by the surveillance module.

FIG. 5B includes an example of a screenshot that includes a single person whose face is partially obscured (e.g., covered by a door frame). As can be seen in FIG. 5B, the feature responsible for obscuring the face may not influence the determination of the region to be blurred. Instead, the feature may simply be blurred as if it were part of the face.

Figure 5D:
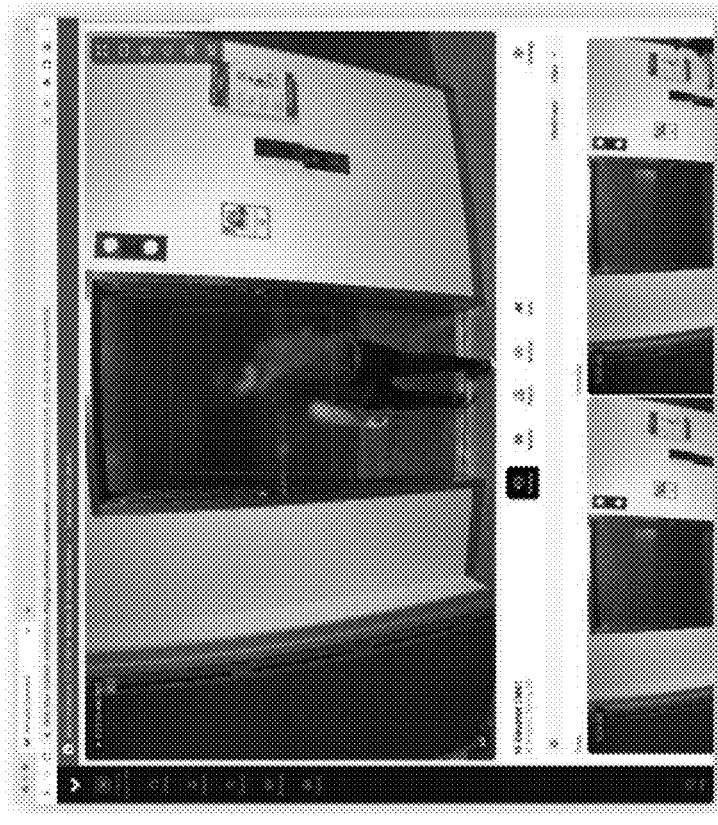
FIG. 5D includes an example of a screenshot that includes a single person whose face is directed away from the digital camera.
Figure 5C:
FIG. 5C includes another example of a screenshot that includes multiple people, though the faces of these people are located in sufficiently close proximity that the faces can be blurred by a single geometric region.

FIG. 5C includes another example of a screenshot that includes multiple people. However, in contrast to FIG. 5A, the faces of these people are located in sufficiently close proximity that the faces can be blurred by a single geometric region. In situations where there are multiple faces in close proximity, the surveillance module may blur the superset of the geometric regions defined for the faces. Alternatively, the surveillance module may determine a new geometric region based on an analysis of the geometric regions defined for the faces. The new geometric region may be representative of a superset of the regions, though the border may be redefined to form a more conventional shape (e.g., a larger square or rectangle rather than two conjoined squares or rectangles).

FIG. 5D includes an example of a screenshot that includes a single person whose face is directed away from the digital camera. Even though the face is directed away from the digital camera, the appropriate portion of the digital image is still blurred. FIG. 5E includes another example of a screenshot that includes a single individual whose face is directed away from the digital camera. However, in FIG. 5E, the individual is sitting rather than standing. While a change in position may affect the location of the face, the surveillance module can still blur the appropriate region.

Figure 5F:
FIG. 5F includes an example of a screenshot that includes multiple people, at least some of whom "overlap" one another in the frame.
Figure 5E:
FIG. 5E includes another example of a screenshot that includes a single individual whose face is directed away from the digital camera.

FIG. 5F includes an example of a screenshot that includes multiple people, at least some of whom "overlap" one another in the frame. Once again, the surveillance module can identify these people without issue, as the object detection model is able to identify these people and the surveillance module is able to define an appropriate geometric region for blurring.

Figure 5H:
FIG. 5H includes an example of a screenshot that includes a single individual who is moving across the frame.
Figure 5G:
FIG. 5G includes an example of a screenshot that includes a single individual who is viewable through a window.

FIG. 5G includes an example of a screenshot that includes a single individual who is viewable through a window. Despite being outside of the environment of interest— namely, the building—the face may still be blurred so long as the individual is within the bounds of the frame. In this situation, the individual is viewable through a largely transparent window. However, the same may hold true for individuals who are visible in a mirror, for example. If the reflection of an individual is viewable in a mirror, her body may still be detected by the object detection module and the surveillance module can define the geometric region accordingly.

FIG. 5H includes an example of a screenshot that includes a single individual who is moving across the frame. In this screenshot, the individual is in the process of moving a cart across the hall, toward the left side of the digital image. Performing an action—for example, walking—may not influence the outputs produced by the surveillance module, as the object detection model is designed to detect people on a per-frame basis.

As can be seen in FIGS. 5A-H, the interfaces presented by the web browser may include a digital element that, when selected, allows blurred portions to be revealed. In order to determine whether a user is permitted to view an unblurred portion, the surveillance module may establish that the user has appropriate permissions. This can be accomplished by requiring that the user log in. For example, the user may be prompted to input credentials for a surveillance platform that supports or enables the surveillance module. While the surveillance module may be executed by a web browser, the surveillance platform is normally executed by a server system.

In some embodiments, the surveillance module determines whether to reveal unblurred portions in a binary manner. That is, the surveillance module may determine whether to reveal all unblurred portions contained in a frame or none of the unblurred portions contained in the frame. In other embodiments, the surveillance module determines whether to reveal unblurred portions on a per-portion basis. Thus, the surveillance module may require that the user specify which blurred portion should be revealed, and then upon receiving input indicative of a selection of a given blurred portion, the surveillance module can determine whether the user has appropriate permissions to view the given blurred portion. Such an approach allows the surveillance module to take a more personalized approach to revealing sensitive information. Some blurred portions may be accessible to a small subset of users (e.g., members of a security team), while other blurred portions may be accessible to a larger subset of users (e.g., employees in addition to members of the security team).

Methodologies for Reversibly Blurring Digital Images

FIG. 6 includes a flow diagram of a process 600 for blurring a portion of a digital image that could be used to biometrically identify a person. As mentioned above, the process 600 could be performed by a surveillance module that is implemented by, or accessible to, a web browser. Initially, the surveillance module can establish a connection with a digital camera that is part of a surveillance system responsible for monitoring an environment (step 601). Through this connection, digital images that are generated by the digital camera can be received by the surveillance module in temporal order over time. As shown in FIG. 3, the digital images may be provided directly to the surveillance module or indirectly to the surveillance module (e.g., via a server system or mediatory device).

The surveillance module can then initialize (i) a rendering program that allows for rendering in a canvas that is visible via the web browser, (ii) a thread that is asynchronously executable, and therefore programmatically independent from the canvas, (iii) an object detection model within the thread, and (iv) an object tracking system within the web browser (step 602). As mentioned above, applying the object detection model may be "heavy" in terms of required processing resources, and therefore the surveillance module may apply the object detection module on a periodic basis. For intervening digital images, the surveillance module may utilize the object tracking system.

For each digital image received from the digital camera, the surveillance module can determine whether a blur function is enabled (step 603) and in response to a determination that the blur function is enabled, establish a position of a person in that digital image and then determine, based on the position, a region to blur for the person (step 604). As mentioned above, the position of the person could be established using the object detection model or object tracking system.

If the surveillance module determines that the object detection model should be applied, then the surveillance module can resize that digital image to match expected input dimensions for the object detection model and then provide corresponding image data to the thread for application of the object detection model. Thereafter, the surveillance module may receive, from the thread, a predicted position of the person that is produced by the object detection model as output upon being applied to the corresponding image data. Accordingly, the region to blur may correspond to the predicted position in some instances. Moreover, the surveillance module may update the object tracking system with the predicted position.

If the surveillance module determines that the object detection model should not be applied, then the surveillance module can query the object tracking system. For example, the surveillance module may provide the corresponding image data to the object tracking system, and the object tracking system may infer the position of the person based on an analysis of the corresponding image data and the most recent predicted position output by the object detection model. Accordingly, the region to blur may correspond to the inferred position in other instances.

Regardless of whether the position of the person is predicted by the object detection model or inferred by the object tracking system, the surveillance module can update the rendering program with the region to blur for the person, so as to cause each digital image to be presented on the canvas with an appropriate region blurred (step 605).

FIG. 7 includes a flow diagram of a process 700 for selectively blurring regions in digital images for identity obfuscation purposes. Initially, a surveillance module can receive a first digital image generated by a digital camera that is part of a surveillance system responsible for monitoring an environment (step 701). The surveillance module can apply, to the first digital image, an object detection model to produce an output that is representative of a predicted position of a person (step 702). At a high level, the object detection model may be a machine learning model that has been designed and trained to identify a specific type of objects (e.g., bodies or faces) through analysis of the content of digital images. Then, the surveillance module can determine a first region to blur based on the predicted position of the person (step 703). In some embodiments, the location of the first region directly correlates to the predicted position, for example, if the object detection model is designed and trained to identify faces. In other embodiments, the location of the first region is computed, derived, or inferred based on the predicted position, for example, if the object detection model is designed and trained to identify bodies. The surveillance module can update a rendering program with the first region to blur, so as to cause the first digital image to be presented by the web browser with the region blurred (step 704). As discussed above with reference to FIG. 4, steps 702-704 may be performed as part of a rendering loop that is defined prior to runtime.

Generally, the first digital image is one of a series of digital images that are received by the surveillance module in temporal order. The object detection model may be applied on a periodic basis, such that the object detection model is applied to a first subset of the series of digital images. Position of the person in a second subset of the series of digital images to which the object detection model is not applied may be inferred by an object tracking system. The object tracking system can infer position of the person based on (i) content of a given digital image supplied as input and (ii) a most recent predicted position output by the object detection model. Together, the first and second subsets may include all digital images in the series of digital images, and therefore for each digital image, position of the person may either be predicted by the object detection model or inferred by the object tracking system.

Thereafter, the surveillance module may receive a second digital image generated by the digital camera (step 705). As mentioned above, the surveillance module may apply the object detection model on a periodic basis to conserve processing resources. In the event that the second digital image is generated immediately or shortly after the first digital image, the surveillance module may instead provide the second digital image to the object tracking system, so as to obtain an inferred position of the person that is produced by the object tracking system based on the predicted position of the person (step 706). The surveillance module can determine a second region to blur based on the inferred position of the person (step 707) and then update the rendering program with the second region to blur, so as to cause the second digital image to be presented by the web browser with the second region blurred (step 708). Note that if the first and second digital images are generated in rapid succession (e.g., within several hundred milliseconds), the person may not move much, if at all, within the environment. Accordingly, the second region may partially or entirely overlap with the first region.

Figure 8:
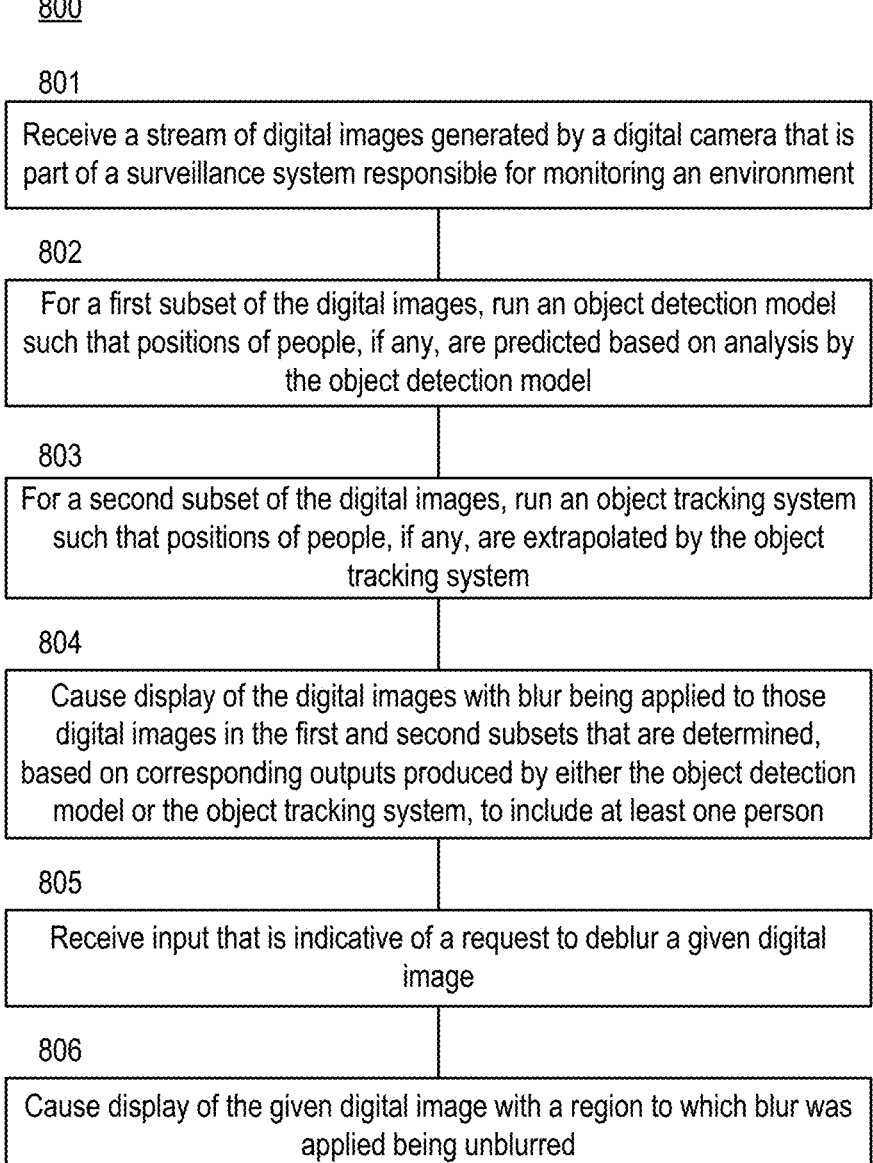
FIG. 8 includes a flow diagram of a process for processing a stream of digital images and selecting blurring portions of the digital images for identity obfuscation purposes.

FIG. 8 includes a flow diagram of a process 800 for processing a stream of digital images and selecting blurring portions of the digital images for identity obfuscation purposes. Initially, a surveillance module can receive a stream of digital images generated by a digital camera that is part of a surveillance system responsible for monitoring an environment (step 801). For a first subset of the digital images, the surveillance module can run an object detection model such that positions of people, if any, are predicted based on analysis by the object detection model (step 802). For a second subset of the digital images, the surveillance module can run an object tracking system such that positions of people, if any, are extrapolated by the object tracking system (step 803). Note that the number of digital images included in the first and second subsets may vary depending on the processing resources available to the surveillance module. For example, the object detection model may be applied more frequently if more processing resources are available and/or digital images are generated at a lower frequency.

Then, the surveillance module can cause display of the digital images with blur being applied to those digital images in the first and second subsets that are determined, based on corresponding outputs produced by either the object detection model or the object tracking system, to include at least one person (step 804). For example, for each digital image that is determined to include at least one person, blur may be applied to obfuscate the face of each person.

As mentioned above, the blur may be selectively reversible in some embodiments. Accordingly, the surveillance module may receive input that is indicative of a request to deblur a given digital image (step 805). The input may be provided, by a user, via an interaction with the interface on which the blurred digital images are displayed. In response to receiving the input, the surveillance module can cause display of the given digital image with a region to which blur was applied being unblurred (step 806). Note that in some embodiments, whether the user is permitted to unblur the given digital image may depend on her permissions. Said another way, whether the region is unblurred may depend on whether permissions associated with the user satisfy a criterion. These permissions may be based on various factors, such as whether a job title associated with the user or a unique identifier (e.g., email address or employee number) associated with the user is included on a list of users approved to deblur digital images.

Processing System

Figure 9:
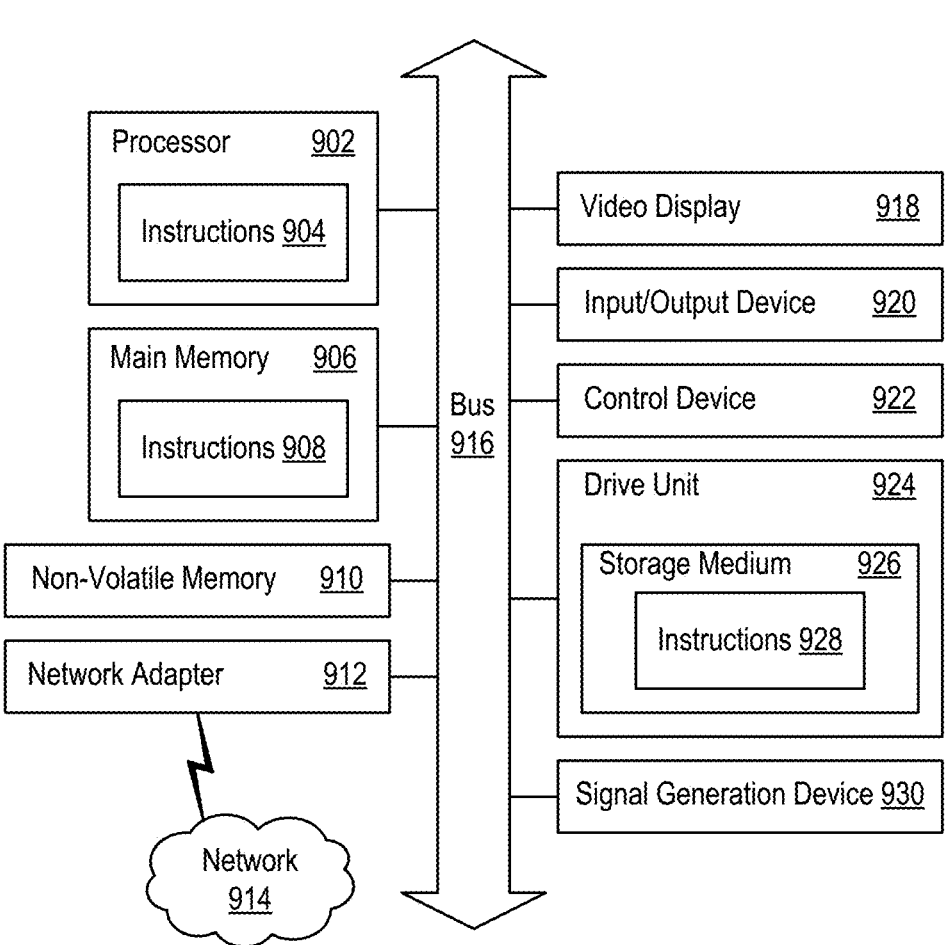
FIG. 9 is a block diagram illustrating an example of a processing system in which at least some operations described herein can be implemented.

FIG. 9 is a block diagram illustrating an example of a processing system 900 in which at least some operations described herein can be implemented. For example, components of the processing system 900 may be hosted on an edge device that is part of a surveillance system, a server system that is communicatively connected to the surveillance system, or a computing device on which a surveillance module is stored and executed.

The processing system 900 may include a processor 902, main memory 906, non-volatile memory 910, network adapter 912, display mechanism 918, input/output device 920, control device 922 (e.g., a keyboard, pointing device, or mechanical input such as a button), drive unit 924 that includes a storage medium 926, or signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, Peripheral Component Interconnect ("PCI") bus, PCI-Express bus, Hyper Transport bus, Industry Standard Architecture ("ISA") bus, Small Computer System Interface ("SCSI") bus, Universal Serial Bus ("USB"), Inter-Integrated Circuit ("I²C") bus, or a bus compliant with Institute of Electrical and Electronics Engineers ("IEEE") Standard 1394.

While the main memory 906, non-volatile memory 910, and storage medium 926 are shown to be a single medium, the terms "storage medium" and "machine-readable medium" should be taken to include a single medium or multiple media that stores instructions 904, 908, 928. The terms "storage medium" and "machine-readable medium" should also be taken to include any medium that is capable of storing, encoding, or carrying a set of instructions for execution by the processing system 900.

In general, the routines executed to implement the embodiments of the present disclosure may be implemented as part of an operating system or a specific computer program. Computer programs typically comprise one or more instructions (e.g., instructions 904, 908, 928) set at various times in various memories and storage devices in a computing device. When read and executed by the processor 902, the instructions cause the processing system 900 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile memory and non-volatile memory 910, removable disks, hard disk drives, optical disks (e.g., Compact Disk Read-Only Memory ("CD-ROM") and Digital Versatile Disks ("DVDs")), cloud-based storage, and transmission-type media such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a switch, a protocol converter, a gateway, a bridge, a hub, a receiver, a repeater, or a transceiver that includes a wireless chipset (e.g., enabling communication over Bluetooth or Wi-Fi).

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the claimed subject matter and its practical applications, thereby enabling those skilled in the relevant art to understand the claimed subject matter, the various embodiments, and the various modifications that are suited to the uses contemplated.

Although the Detailed Description describes certain embodiments, the technology can be practiced in many ways no matter how detailed the Detailed Description appears. Embodiments may vary considerably in their implementation details, while still being encompassed by the present disclosure. Terminology that is used when describing certain embodiments should not be taken to imply that the terminology is being redefined herein to be restricted to any specific characteristics, features, or aspects of the technology with which that terminology is associated. In general, the terms used in the following claims should not be construed to limit the technology to the specific embodiments described in the Detailed Description, unless those terms are explicitly defined herein. Accordingly, the actual scope of the technology encompasses not only the disclosed embodiments, but also all equivalent ways of practicing or implementing the technology.

The language used in the present disclosure has been principally selected for readability and instructional purposes. It may not have been selected to delineate or circumscribe the technology. It is therefore intended that the scope of the present disclosure be limited not by the Detailed Description, but rather by any claims that issue on an application based hereon. Accordingly, the disclosure of embodiments is intended to be illustrative, but not limiting, of the scope of the technology as set forth in the following claims.

What is claimed is:

1. A method performed by a computer program implemented by, or accessible to, a web browser, the method comprising:
    receiving digital images that are generated by a digital camera that is part of a surveillance system responsible for monitoring an environment;
    for each of the digital images,
        applying either
        a first machine learning model that predicts positions of people, if any, in that digital image, or
        a second machine learning model that infers positions of people, if any, in that digital image,
        wherein the first machine learning model is applied to the digital images at a fixed frequency, while the second machine learning model is applied to digital images to which the first machine learning model is not applied such that the first machine learning model is applied to a first subset of the digital images and the second machine learning model is applied to a second subset of the digital images; and
    causing display of the digital images with blur being applied to those digital images that are determined, based on outputs produced by the first and second machine learning models, to include at least one person.

2. The method of claim 1, further comprising:
    initializing
        (i) a rendering program that allows for rendering in a canvas that is visible via the web browser,
        (ii) a thread that is programmatically independent from the canvas,
        (iii) the first machine learning model within the thread, and
        (iv) the second machine learning model within the web browser.

3. The method of claim 2, wherein said causing comprises:
    for each of the digital images,
        determining a region in that digital image to blur based on either a predicted position output by the first machine learning model or an inferred position output by the second machine learning model, and
        updating the rendering program with the region to blur, so as to cause that digital image to be presented on the canvas with the region blurred.

4. The method of claim 1, further comprising:
    for each of the digital images,
        determining whether the first machine learning model is to be applied; and
        in response to a determination that the first machine learning model is to be applied,
            resizing that digital image to match expected input dimensions for the first machine learning model; and
            providing that resized digital image to the first machine learning model as input.

5. The method of claim 1, wherein for a given digital image to which the first machine learning model is not applied, the second machine learning model infers position of each person contained therein based on (i) content of the given digital image and (ii) a most recent predicted position of that person.

6. The method of claim 1, wherein the digital images are received from the digital camera.

7. A non-transitory medium with instructions stored thereon that, when executed by a processor of a computing device, cause the computing device to perform operations comprising:
    receiving digital images that are arranged in temporal order and that are generated by a digital camera that is part of a surveillance system responsible for monitoring an environment;
    applying, to the digital images at a given frequency, a first machine learning model that is trained to identify faces and that outputs predicted positions of faces, if any, in each digital image supplied as input; and
    in response to a predicted position of a face being output by the first machine learning model,
        causing display of a corresponding one of the digital images with blur being applied to a region corresponding to the predicted position; and
        providing the predicted position to a second machine learning model that is to be applied to a next one of the digital image that is generated images;
    wherein the second machine learning model is applied to each of the digital images to which the first machine learning model is not applied, such that the first machine learning model is applied to a first subset of the digital images and the second machine learning model is applied to a second subset of the digital images.

8. The non-transitory medium of claim 7, wherein the blur is selectively reversible through an interface on which the digital image is displayed.

9. The non-transitory medium of claim 7, wherein each of the digital images is initially loaded into a queue, where either the first machine learning model or the second machine learning model is applied, and then removed from the queue for display.

10. The non-transitory medium of claim 7, wherein for the next digital image, the second machine learning model infers a position of the face based on (i) content of the next digital image and (ii) the predicted position output by the first machine learning model.

11. The non-transitory medium of claim 7, wherein the digital images are received directly from the digital camera or another computing device that is part of the surveillance system.

12. The non-transitory medium of claim 7, wherein the digital images are received from a server system to which the surveillance system is communicatively connected.

13. A non-transitory medium with instructions stored thereon that, when executed by a processor of a computing device, cause the computing device to perform operations comprising:

receiving a digital image that is generated by a digital camera that is part of a surveillance system responsible for monitoring an environment;

applying, to the digital image, a first machine learning model that is trained to identify faces and outputs predicted positions of faces, if any, in that digital image; and in response to a predicted position of a face being output by the first machine learning model for the digital image, causing display of the digital image with blur being applied to a region corresponding to the predicted position; and providing the predicted position to a second machine learning model that is to be applied to a next digital image that is generated by the digital camera, wherein the digital image is one of multiple digital images that are generated by the digital camera and received in temporal order, and wherein the first machine learning model is applied to the multiple digital images at a predetermined frequency, while the second machine learning model is applied to digital images to which the first machine learning model is not applied, and wherein the predetermined frequency is variable based on performant capability of a web browser in which the multiple digital images are displayed.

14. The non-transitory medium of claim 13, wherein each of the digital images is initially loaded into a queue, where either the first machine learning model or the second machine learning model is applied, and then removed from the queue for display.

15. The non-transitory medium of claim 13, wherein the blur is selectively reversible through an interface on which the digital image is displayed.

16. The non-transitory medium of claim 13, wherein for the next digital image, the second machine learning model infers a position of the face based on (i) content of the next digital image and (ii) the predicted position output by the first machine learning model.

17. The non-transitory medium of claim 13, wherein the digital images are received directly from the digital camera or another computing device that is part of the surveillance system.

18. The non-transitory medium of claim 13, wherein the digital images are received from a server system to which the surveillance system is communicatively connected.

19. A method comprising:

receiving digital images that are generated by a digital camera that monitors an environment and that are arranged in temporal order;

for each of the digital images, either (a) predicting positions of people, if any, in that digital image based on an analysis of that digital image, or (b) inferring positions of people, if any, in that digital image based on an analysis of that digital image and a most recently predicted position of each person, wherein said predicting is performed at a predetermined frequency while said inferring is performed for digital images for which said predicting is not performed, such that said predicting is performed for a first subset of the digital images and said inferring is performed for a second subset of the digital images; and causing a computer program to display the digital images, in temporal order, with blur being applied to a subset of the digital images that are determined to include at least one person.

20. The method of claim 19, wherein for each digital image in the subset, a region to be blurred is determined based on a predicted position or an inferred position of each person in that digital image.

21. The method of claim 19, wherein the computer program is a web browser.

22. The method of claim 19, further comprising:

receiving input that is indicative of a request from an individual to deblur a given digital image; and causing display of the given digital image with a region to which blur was applied being unblurred.

23. The method of claim 22, further comprising:

determining whether a characteristic of the individual satisfies a criterion;

wherein the region is unblurred in response to a determination that the characteristic satisfies the criterion.

24. The method of claim 23, wherein the characteristic is a permission level, a job title, or an identifier that uniquely identifies the individual.

* * * * *